FIG. 5d
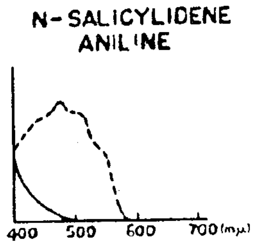
FIG. 5e
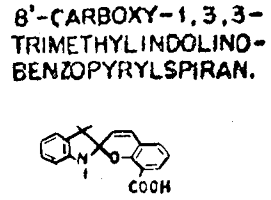
FIG. 5e-2
FIG. 5e-1
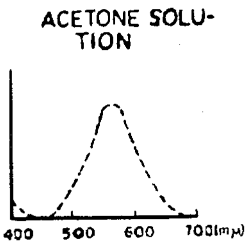
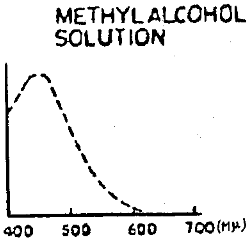
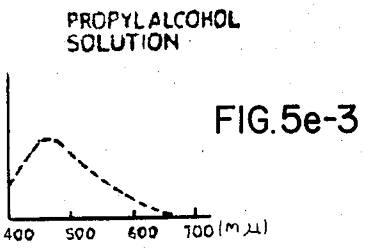
FIG. 5e-3
FIG. 5f
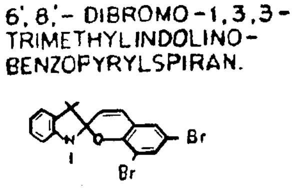
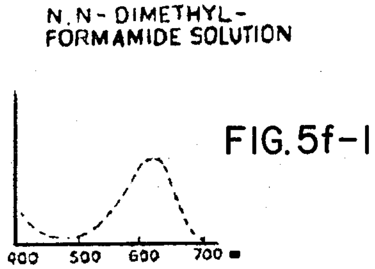
FIG. 5f-1
FIG. 5f-2
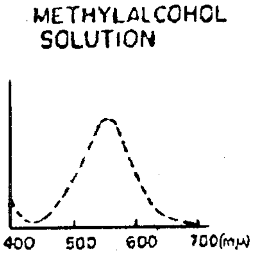
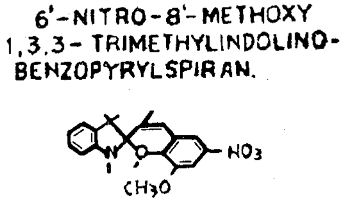
FIG. 5g FIG. 5g-1
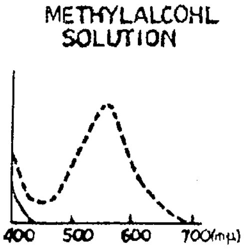
FIG. 5g-2
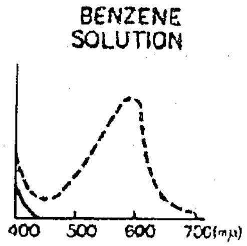
FIG. 5g-3
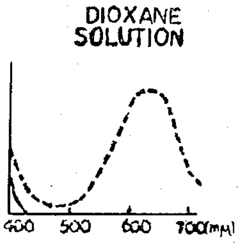
5'-NITRO-8'-METHOXY-1,3,3,-
TRIMETHYLINDOLINOBENZOPYRYLSPIRAN.
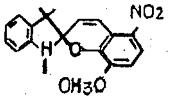
FIG. 5h
FIG. 5h-1
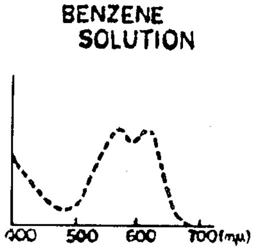
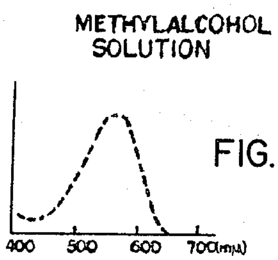
FIG. 5h-2
6'-NITRO-1,3,3,-TRIMETHYL-
INDOLINOBENZOPYRYLSPIRAN.
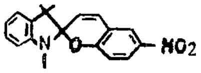
FIG. 5i
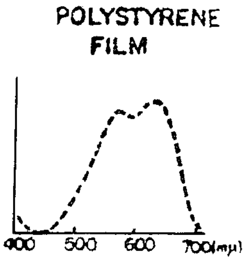
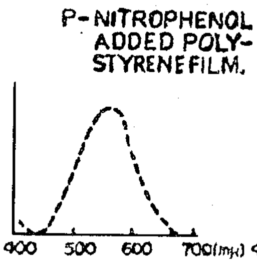
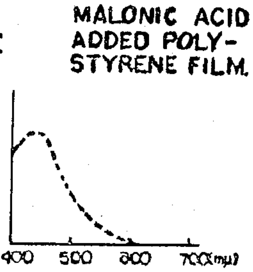
FIG. 5i-1 FIG. 5i-2 FIG. 5i-3

United States Patent Office 3,825,427
Patented July 23, 1974

3,825,427
RECORDING MEMBER OF PHOTOCOLOR DEVELOPING AND ELIMINATING MATERIAL AND THE RECORDING METHOD

Eiichi Inoue, Isamu Shimizu, Hajime Kobayashi, and Ichiro Endo, Tokyo, Japan, assignors to Canon Camera Kabushiki Kaisha, Tokyo, Japan Application Feb. 15, 1968, Ser. No. 705,758, which is a continuation-in-part of application Ser. No. 630,519, Apr. 13, 1967, both now abandoned. Divided and this application June 14, 1971, Ser. No. 153,037
Claims priority, application Japan, June 19, 1967, 42/39,203; Aug. 16, 1967, 42/52,859
Int. Cl. G03c *1/52*
U.S. Cl. 96—90 PC 5 Claims

ABSTRACT OF THE DISCLOSURE

This invention provides a photocolor developing and eliminating composition, a recording member of monochrome or multicolor developing and eliminating composition, method for image forming, fixing, or restoring which is applicable to said recording members and usual recording members of photocolor developing and eliminating material, and method for projecting image on a screen of photocolor developing and eliminating material. A photocolor developing and eliminating composition comprises a photocolor developing and eliminating material and a stabilizer, which is either electron or proton donating or accepting material or solid matter, on which surface said material being dispersed and which inherently possesses acidic, basic, ionic, electric charge transferring or high surface energy property at the surface, and the stabilizer stabilizing the color-developed state continuously, restoring after fixing the color-developed state to the colorless state by the stimulus of radiation having another range of wave length and reproducing a stable color-development. The multicolor developing and eliminating composition comprises a film matter prepared by incorporating a photocolor developing and eliminating material to a transparent or translucent dispersion medium or the film attaching to a support such as paper and the like, and the recording member is wholly color-developed by irradiating it by a radiation having at least one range of wave-length such as light, heat and the like. Particularly, at least one dispersion medium is used to cover the whole visible light range in the colored state. And the color image recording method is very useful for the rapid, simple and much memorizing and recording in information industry such as communication, measurement documentation and display.

This is a division of Application Ser. No. 705,758, filed Feb. 15, 1968, now abandoned, which in turn is a continuation-in-part of Application Ser. No. 630,519, filed Apr. 13, 1967 and now abandoned.

This invention relates to a recording technique in which a photocolor developing and eliminating material is used. More particularly, this invention relates to a novel recording member of monochrome or multicolor photocolor developing and eliminating material, method for color-developing, fixing and restoring which are applicable to said recording members and usual recording members of photocolor developing and eliminating material, and image projecting methods in which novel screens comprising photocolor developing and eliminating material are used.

Heretofore, photosensitive materials used in conventional recording, photographic or copying technique are such that a latent image is formed on said photosensitive material by exposure, developed by chemical or physical means and then fixed to form stable images. In such prior art a number of processes are necessary to form the image, and a fairly large apparatus and consumption materials are required. In addition, the treating speed is disadvantageously slow.

In conventional photographic techniques such as the silver salt photography, the diazo photography, the thermal photography, electrophotography and the like, the image formation is carried out according to the above mentioned processes. Among these processes, there is seldom a process in which a once formed stable image is eliminated and the same photosensitive surface is again exposed to form an image. A conventional recording material by which a photosensitive surface is exposed to light to form an image thereon and the image is then eliminated followed by new exposure to form another image is a photochromic material.

A photochromic material is generally converted to the colored state by irradiating a radiation having a specified wave length or a specified energy (including rays of wave length in the range of infrared or ultraviolet ray etc., hereinfater comprehensively called "radiation") and the formed color is eliminated by the stimulus of heat or light having different wave length or radiation having different energy. When the photochromic material is used as a material for a recording member, the recording member is exposed to a radiation having a specified range of wave length to form colored images and then another radiation having a range of wave length different from the previous one is applied to eliminate all of or a part of the colored images. Thus, the recording member is ready for re-exposure. As mentioned above, a recording member comprising a photochromic material can effectively reproduce various images repeatedly on the same recording member.

However, the conventional photochromic substances (hereinafter called "photocolor developing and eliminating material") can not remain lastingly in the colored state for a long time. Therefore, when a photochromic material is used as a material of a recording member, an image which is stable for a long time is not obtained.

In order to solve such problem, heretofore, a photocolor developing and eliminating material has been irradiated with a radiation to develop a color and the colored state thus formed has been simply stabilized. However, such stabilizing treatment makes the elimination of the once stabilized image difficult as in case of the printing-out photography and deteriorates the photocolor developing and eliminating property. Thus, the repeating recording by the same recording member is not possible.

The color-developing mechanism of photocolor developing and eliminating materials is not yet fully understood. However, the presently known photocolor developing and eliminating materials are considered to develop the color by a change such as photo-ion dissociation, photo hydrogen transmission, photo radical dissociation, photo steric structure change, photooxidation, photoreduction and the like caused by irradiation of light (radiation).

According to this invention, a photocolor developing and eliminating material system and a stabilizer co-exist to stabilize the color-developed state continuously, restore the color-developed state to the colorless state by the stimulus of radiation having another range of wave length and reproduce a stable color-development. The photocolor developing and eliminating material systems include those which develop color by a change such as photo-ion dissociation, photo radical dissociation, photo hydrogen transmission, photo steric structure change, photooxidation, photoreduction and the like. The stabilizer is a material system which stabilizes the color-developed state, eliminates the stabilized state by a stimulus of radiation having the other range of wave length to restore to the original colorless state. The stabilizer is a material system having a property of electron or proton donating or accepting which copes with atoms, atom groups, free radicals, ions etc. generated by the color-developing mechanism involved in color-developed state of the photocolor developing and eliminating material.

The stabilizing mechanisms of the stabilizer is not yet clarified, but it is probably considered that the atoms, atom groups, free radicals, ions etc. generated as above are stably retained without causing a reversible reaction by the electron or proton donating or accepting reaction with the stabilized and as the result the color-developed state of the photocolor developing and eliminating material is stabilized. Thus, a novel recording member which can produce stable colored images is obtained by incorporating the photocolor developing and eliminating material and the stabilizer to the photosensitive layer of the recording member.

The photocolor developing and eliminating material and the stabilizer as mentioned above are homogeneous system materials. When the stabilizer is dissolved in a dispersion medium together with the photocolor developing and eliminating material, the stabilizer is dissolved therein in the molecular state and assumes a property of electron or proton donating or accepting. The stabilizer in the molecular state effects the electron or proton donating or accepting action with the atoms, atom groups, free radicals, ions or the like produced in the color-developed state of the photocolor developing and eliminating material. As the result, the stabilization is effected.

While the above mentioned stabilizer is composed of a material of homogeneous system, according to an additional aspect of this invention a heterogeneous material or an intermediate material is also effectively used as a stabilizer for the photocolor developing and eliminating material. The stabilizers of a heterogeneous material or intermediate materials are heterogeneous system materials, the surface of solid particles of which are acidic, basic, ionic, of electric charge transferring or of high surface energy, or the particle surface of which is treated so as to assume such property as mentioned above. Examples of the stabilizers include solid acids, solid bases, sizing agents, ionic solid and the like. The photocolor developing and eliminating material may be bonded to the solid particle surface of the stabilizer by simply contacting or using a binder.

In general, the heterogeneous system material is in a form of particle-like solid at a usual state. Therefore, the heterogeneous system material can not exist in a molecular state together with the photocolor developing and eliminating material while the stabilizer of electron or proton donating or accepting material can be present in a molecular state. The heterogeneous system material is not dissolved in a dispersion medium in a molecular state, but dispersed in the medium in a state of solid particle. Therefore, the stabilizing mechanism of the heterogeneous system material is different from that of the homogeneous system material. The solid particle itself of the heterogeneous system material should have a stabilization effect. According to the present invention, a heterogeneous system material, the solid particle surface of which intrinsically possesses a tendency of stabilizing the photocolor developing and eliminating material is selected as a stabilizer. Examples of such material include materials which surface is acidic, basic, ionic, of electric charge transferring, or of high surface energy. The photocolor developing and eliminating material is uniformly bonded to the surface of the solid particle of the stabilizer by contacting or using a binder to stabilize the photocolor developing and eliminating material in the color developed state.

Alternatively, the particle surface of the heterogeneous system material is subjected to a stabilizing treatment in advance so as to impart acidic property, basic property, ionic property, electric charge transferring property or high surface energy thereto, and then the particle surface thus treated is homogeneously coated with the photocolor developing and eliminating psoperty. Particularly, when tacting or using a binder to produce a novel and stable photocolor developing and eliminating member having a stable color-developed state and retaining the photocolor developing and eliminating property. Particularly, when the photocolor developing and eliminating material contacted with the particle surface is imprengated with a stabilizer of a homogeneous system material such as an electron or proton donating or accepting material as mentioned above, a remarkably stable photocolor developing and eliminating material is produced.

In other words, according to the aspect of this invention inwhich a heterogeneous system material is employed as a stabilizer, the surface of the stabilizer particle which has inherently acidic property, basic property, ionic property, electric charge transferring property and high surface energy or the surface of the stabilizer particle which is subjected to the treatment for imparting to the surface the acidic property, basic property, ionic property, electric charge transferring property or high surface energy, is contacted with or coated with the photocolor developing and eliminating material alone or the photocolor developing and eliminating material to which an electron or proton donating or accepting material is incorporated as a stabilizer. Thus, the color-developed state of the photocolor developing and eliminating material is continuously stabilized and can be restored to the colorless state by a stimulus of a radiation having the other range of wave length.

The stabilization means of the photocolor developing and eliminating material as mentioned above may be applied to the fixing and chemical elimination of the color-developed image, the color image recording member, or the color image recording method as mentioned later. It is possible to obtain clear contrast, excellent half tone images as well as line images. The images may be erased or modified if desired. Further, the recording member and the recording process may be used in multiple uses. The recording member in which the photocolor developing and eliminating material stabilized in accordance with the present invention gives stable color-developed images, and the fixing and chemical elimination of the color-developed image as described later is established. Therefore, the recording member and the recording process of this invention may find remarkable uses in the fields of calculation, translation, communication, documentation or the other various information treating systems for recording, accumulation, modification, erasing and layout of the information.

It is an object of this invention to provide novel photocolor developing and eliminating matters in which the unstable color-developed state of photocolor developing and eliminating materials is stabilized continuously and the color-developed state can be eliminated by a radiation having the other range of wave length, i.e. the reversibility of photocolor developing and eliminating property is still retained.

It is a further object of this invention to provide novel recording members which can produce the color-developed images stabilized continuously.

The above-mentioned various stabilizing means can retain the color-developed stage of image for from several ten minutes to several ten hours, but the developed color image is not kept as an everlasting image.

According to a further aspect of this invention, the color developed state of the photocolor developing and eliminating material is retained as an everlasting image, that is, fixed, and further the lasting image thus produced is restored to the original state in which the material assumes the photocolor developing and eliminating property.

Heretofore, a fixing and restoring method has not yet known by which the color-developed image of the photocolor developing and eliminating material is fixed as an everlasting image and then the fixed image is restored to the original stage where the material processes the photocolor developing and eliminating property. According to conventional methods, when the color-developed image is once fixed as an everlasting image, for example, in the printing-out photography, it is not possible to restore the material to the original state where the photocolor developing and eliminating property is restored again. According to the method of this invention, the fixing is carried out by treating the photocolor developing and eliminating recording member in the color-developed state with a basic material or an anion. The color-developed image is converted to a latent image, for example, when the photocolor developing and eliminating material is a spiropyran compound, the color-developed image is changed to a yellow latent image state. The mechanism is not yet fully understood, but it is considered that the atom, atom group, free radical or the like produced in the photocolor developing and eliminating material in the color-developed state is combined with the basic material to form a certain stable chemical complex which is everlastingly retained as the yellow latent image.

Further, with respect to the restoring method, the fixed image is treated with an acidic material (cationic treatment). It is considered that this treatment neutralizes a certain chemical complex salt forming a yellow latent image and the basic material as the fixing agent is eliminated to form a colored image having photoreversibility.

It is a further object of this invention to provide a process comprising fixing as an everlasting stable image a color-developed image of a recording member including singly a photocolor developing and eliminating material, a recording member including a photocolor developing and eliminating material to which a stabilizer is incorporated, or a recording member which is prepared by contacting or coating the surface of particles of a heterogeneous system material, which itself has inherently the stabilizing activity or is subjected to a stabilizing treatment, with a photocolor developing and eliminating material.

Also, it is a further object of this invention to provide a restoring process which comprises restoring the fixed image to the original photocolor developing and eliminating state thereby the material assuming a photoreversibility.

It is a further object of this invention to develop the application fields of the recording member by imparting the everlasting property to the color-developed visible image and, if desired, by reverting the color-developed image to the original photocolor developing and eliminating state.

In view of the special properties of the recording member comprising a photocolor developing and eliminating material and the stabilization, fixation, and restoration thereof, various novel reproduction methods are provided.

According to a further aspect of this invention, a normal image or a reverse image can be optionally formed on the same recording member by using a recording member comprising a photocolor developing and eliminating material according to a simple process.

Heretofore, a reverse image has been produced often by a wet process of chemical procedure and the stability of procedure has not been satisfactory, and moreover a fairly large scale apparatus and a lot of consumption materials are required. In addition, the treating speed is disadvantageously slow.

According to this invention, the inherent properties of photocolor developing and eliminating materials are utilized to form a reverse color-developed image by irradiating a recording member comprising a photocolor developing and eliminating material through an original pattern by a radiation having a specific range of wave length, or to form a normal image by uniformly color-developing the whole surface of the recording member and irradiating the recording member by a radiation having the other range of wave length. Therefore, the method of this invention enables to form simply and rapidly a desired normal image and a desired reverse image on the same recording member. With respect to the formation of the reverse color-developed image on the recording member, a radiation having wave length ranges corresponding to the characteristic absorption ranges of a photocolor developing and eliminating material in the recording member is projected to the recording member through an original pattern to bring the recording member to a color-developed state having the range of absorption wave length in visible light region. If the original pattern is negative in the above case, a positive color-developed image, i.e. a reverse image, is obtained since the radiation is projected to the portion of the recording member corresponding to the image parts of the original pattern. On the contrary, with respect to the formation of a normal image on the recording member, a radiation having the ranges of wave length corresponding to the characteristic absorption wave length region of the photocolor developing and eliminating material in the recording member is projected to the recording member to color-develop uniformly the whole surface of the recording member, and then the color-developed recording member is irradiated by a radiation having the other range of wave length through a positive original pattern to eliminate the portions of the recording member other than portions corresponding to the original pattern. As the result, a positive color-developed image is formed. Further, the whole surface is color-eliminated and irradiated again by a radiation having the above-mentioned specified range of wave length through a negative original pattern to form a positive reverse image on the recording member. As mentioned above, a normal image or reverse image is optionally obtained by the same recording member. Further, a repetition is possible which eliminates the recorded image by light, restores to the original wholly color-developed state, and records again. Further, a recording member formed by the combination of spirans may be treated with, for example, aliphatic amines such as hexylamine, or a strong alkaline solution such as that of potassium hydroxide to stabilize the image everlastingly in a stage of yellow latent image, and then treated with organic acids or inorganic acids to restore the image to the original colored image.

It is a further object of this invention to provide a novel and simple process for forming optionally a normal image or a reverse image rapidly on the same recording member by using a recording member comprising photocolor developing and eliminating material.

There are various conventional processes for recording colored images. For example, in the known silver salt methods, a color image exposing is carried out and further a color-developing step involving the reduction of the silver salt is necessary. In electrolytic electrophotography, an electrolytic color-developing step is employed, and in diazo methods a coupling color-developing method is employed. However, these prior arts involve a wet type of chemical reaction and lack in the stability of procedure. In addition, the prior arts necessitate a fairly large scale of apparatus and a lot of consumption materials and further the treating speed is disadvantageously slow.

According to the present invention, a novel color recording member based on a novel color recording process is provided. Said recording member comprises a film like matter itself prepared by incorporating a photocolor developing and eliminating material to a transparent or translucent dispersion medium, or said film like matter attached to a support such as paper, transparent support and the like. The recording member is wholly color-developed by irradiating it by a radiation having at least one range of wave length such as light, heat, a combination of light and heat, and the like. Particularly, at least one dispersion medium is used to cover the whole visible light range in the colored state since the combination of the different absorption wave length ranges caused by each combination of the photocolor developing and eliminating material with the different dispersion mediums may cover the whole visible light range. Alternatively, at least one photocolor developing and eliminating material is selected in such a manner that each of the material has each different individual absorption spectrum in the colored state and the combination of the material shows the photocolor eliminating property at the visible light range.

This is explained further in detail below. In general, it is necessary to construct a color recording member in such a manner that the color recording member has the absorption region or the color-developing region over the whole visible light range. According to this invention, the recording member is constructed so that it shows the absorption over the whole visible light range.

(1) In general, the photocolor developing and eliminating material shows the characteristic absorption in ultraviolet wave length range or infrared wave length range before the photocolor developing and eliminating material is color-developed. Therefore, when these materials are irradiated by, for example, a radiation of wave length of ultraviolt region, it becomes a color-developed state having the absorption wave length range at the visible light range. And the color depends on the type of the photocolor developing and eliminating material. The first type of color recording member of this invention comprises at least one photocolor developing and eliminating material which is selected in such a manner that the material has the absorption wave length range over the whole visible light range, and the material is mixed and made into a layer.

(2) The absorption wave length range in the color-developed state can be changed by dissolving the photocolor developing and eliminating material and changing the dispersion medium in which the material is dispersed in a matrix state. The second type of color recording member comprises the photocolor developing and eliminating material dispersed in at least one dispersion medium in a matrix state, the photocolor developing and eliminating material being combined with the dispersion medium in such a manner that the photocolor developing and eliminating material has the absorption wave length range over the whole visible light range at the color developed state and the photocolor developing and eliminating material combined with the dispersion medium being coated to form a multiple layer.

In this case, when the additive such as stabilizer as mentioned above is incorporated to the dispersion medium, the absorption wave length range of the photocolor developing and eliminating material in the visible light range can be somewhat changed in the color developed state. Therefore, when an appropriate dispersion medium and an additive are used in combination, it is possible that one and the same photocolor developing and eliminating material has the absorption wave length range over the whole visible light region in the color developed state. In other words, the photocolor developing and eliminating material is appropriately dispersed in a disperson medium in which an additive is incorporated, and different dispersion mediums are employed to form a multiple layer. Thus, the combinations of the dispersion mediums and the photocolor developing and eliminating material enable to provide a color recording members that the absorption range covers the whole visible light range in the color-developed state.

(3) In (1) and (2) above, a combination of two or more photocolor developing and eliminating materials having each different absorption wave length ranges at the color developed state can cover the whole visible light range. Or, the same photocolor developing and eliminating material is used together with different dispersion mediums to which an additive may be or not incorporated, and at least one of them is arranged as a multiple layer to form a color recording member having the absorption wave length range covering the whole visible light range. Further, the combination of (1) and (2) also provides a recording member. In other words, the absorption wave length range of the photocolor developing and eliminating material in the color-developed state can be easily changed by appropriately selecting the photocolor developing and eliminating material, the dispersion medium and the additive. Therefore, at least one of them having each different absorption wave length is combined to provide a color recording member having the absorption wave length range covering the whole visible light range.

Therefore, the recording member is irradiated by a radiation having at least one specific wave length range to color-develop and then a color original image pattern is projected to the color-developed recording member by using a radiation having the different wave length range to eliminate the developed color of the photocolor developing and eliminating material in the recording member in accordance with the color pattern of the color original image. Thus, a positive color referring to the original image is directly formed and recorded.

Particularly, in the above-mentioned color recording member the photocolor developing and eliminating material is formed in a layer state in accordance with the dispersion medium, for example, in three layers. However, it is not always necessary to form a multiple layer. Alternatively, it is also possible that each of photocolor developing and eliminating materials or a mixture of each of them with a dispersion medium is finely divided and each of the resulting finely divided photocolor developing and eliminating is homogenously mixed and formed in one layer.

Further, a color image formed in the color recording member may be changed to a yellow latent image and stabilized lastingly by treating with an alkali or base. If necessary, the stabilized latent image may be restored to the original color image by an acid treatment.

The color image recording method of the present invention is very useful for the rapid, simple and much memorizing and recording in information industry such as communication, measurement, calculation, documentation and display. Further, it is also useful as monitors in color image treating systems.

It is a further object of this invention to provide a method for producing directly a record of color image by exposing an image recording member to a color image projection. The purpose of this invention is to provide a novel color recording member which utilizes a photocolor developing and eliminating material.

It is a further object of this invention to provide a method which comprises using one and the same color recording member, forming a color image directly on the recording member, eliminating the color image by a radiation having at least one wave length range such as light, heat and a combination of light and heat, and thus forming a color image repeatedly on one and the same recording member.

It is a further object of this invention to provide a method which comprises fixing a color image produced on the novel color developing member to convert the color image to an everlasting stable image in a latent image state and, if necessary, restoring the latent image to the original color image.

It is a further object of this invention to provide a novel image formation by projection in which a photocolor developing and eliminating material and a novel reproduction method are employed.

It is a further object of this invention to provide a novel projection method which comprises using a novel screen comprising a photocolor developing and eliminating recording member and forming optionally a normal image and a reverse image.

In conventional projection methods, a reverse image is prepared in advance and projected. However, the method for obtaining the reverse image necessitates often wet type steps of chemical reactions taking a long time and the procedure stability is low. Further, the method necessitates a fairly large scale apparatus and much consumption materials and the procedure is complex. Further, in the conventional projection method a dark room is necessary to enhance the contrast of the projected image.

This invention provides a novel method of projecting images which uses a screen prepared by dispersing a photocolor developing and eliminating material alone or a photocolor developing and eliminating material to which the previously mentioned material is added, if necessary, a binder being added thereto, in a liquid matrix such as benzene, toluene and the like, or in a high polymer dispersion medium, and forming a film from the resulting dispersion. Alternatively, the screen may be prepared by coating the dispersion of the photocolor developing and eliminating material on a support such as resin, glass, metal, paper, fiber, wood, porcelain and the like.

In this method of this invention, a method of forming a normal image or a reverse image by using one and the same recording member is applied to an image projecting method such as a slide projection, a cinema and the like. In the novel image projection method of this invention, in case that a reverse image projection is obtained by using a screen comprising a photocolor developing and eliminating material, the photocolor developing and eliminating material is usually color-developed by an appropriate exciting light such as ultraviolet light and the like enabling to form an absorption range in the visible light region. When the negative film is irradiated by an appropriate exciting light, the exciting light does not pass through the dark parts of the negative film and the corresponding part on the screen hardly color-develops while the exciting light passes the light part or the transparent part and the corresponding part on the screen color-develops.

Thus, a positive image is obtained from a negative film. This image exists only while the exciting light is projected, and when the exciting light is removed, the image is eliminated. Therefore, the method as mentioned above can be utilized in the projection of cine-film as well as the projection of slide-film. When a screen is made from a material giving an after image, it is not always necessary to project continuously an exciting light. Further, it is effective to project a visible light to a screen for the purpose of accelerating the elimination of the after image or irradiating the screen.

On the contrary, in order to obtain the normal image projection, an already color-developed matter in the visible light range or a matter which has been color-developed by a stimulus of light other than visible light, a stimulus of heat and the like, is exposed to a visible light to eliminate the image, and thereby a normal image projection is obtained.

When the matter is not yet color-developed in a visible light range, it is necessary to color-develop uniformly the whole surface in a visible light range by applying a color-developing means inside of the screen, or from the front or behind the screen. When a visible light is projected through a positive film to the already color-developed screen or the screen color-developed by a certain color-developing means, a developed color at a portion of screen corresponding to a portion of the film which the visible light passes through, is eliminated to give a positive image projection.

It is a further object of this invention to provide a projected image forming process such as a process for obtaining a clear positive projected image directly from a negative film, a process for obtaining a clear negative projected image from a negative film by applying a color-eliminating means to a color-developed projection surface, a process for effecting a reverse projection and a normal projection to one and the same projection surface, and a process by which any dark room is not necessary to form a color-developed image. With respect to "color-developed image" of the photocolor developing and eliminating material, many of the photocolor developing and eliminating materials are usually colorless before color-developing, but some of the photocolor developing and eliminating materials are colored. For example, when a colorless photocolor developing and eliminating material is irradiated by a radiation having the characteristic absorption range, the colorless material is colorized to form a colored image while a colored photocolor developing and eliminating material becomes colorless or the color is changed to a different color. Therefore, the term "color-developed image" in this invention means an image formed by irradiating a colorless or colored photocolor developing and eliminating material by a radiation.

Other object of this invention will be clarified from the detailed explanations in accordance with the attached diagrams. In the following paragraphs, the attached diagrams are briefly explained.

Figure 6:
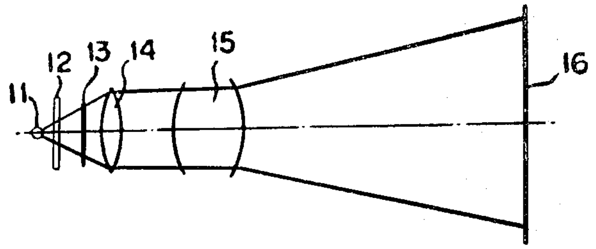
Figure 7:
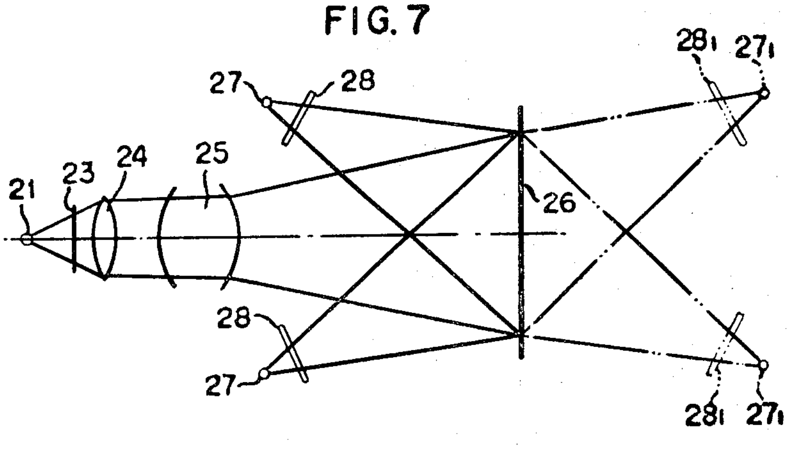
Figure 8:
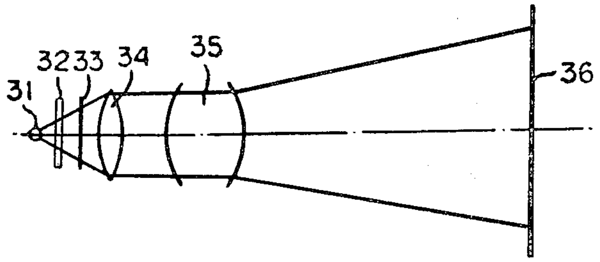

FIG. 6 through FIG. 8 show the embodiments of the method of the production of a projected image of this invention, and FIG. 6 shows the light path for forming the projected image by irradiating a negative film onto a screen made of the photocolor developing and eliminating material with ultraviolet light; FIG. 7 shows the light path of the case when the image of the negative film is projected on a screen with a tungsten lamp, and the screen is irradiated with ultraviolet ray; FIG. 8 shows the light path of the case when the visible light, ultraviolet ray or the mixed light thereof is used as the light source.

Generally speaking, a photocolor developing and eliminating material develops color from the colorless state by exposure, i.e., by the irradiation the radiation of a specific range of wave length, or a photocolor developing eliminating material can change color from the colored state, and can be reduced into the original state by the irradiation of the radiation of other range of wave length. For example spiropyran compound is known to be changed into the state having new absorption in the visible range, i.e., in the photocolor developing state.

However, the color-developed state can be retained for a certain period of time (such as several minutes in polystyrene film at a room temperature) but it is reduced to the original state (colorless state).

As mentioned above, in accordance with this invention, a new photocolor developing and eliminating material whose color-developing state can be stabilized for a long time by taking into consideration the developing and eliminating mechanism through the photocolor developing and eliminating mechanism of the photocolor developing and eliminating material, and the new photocolor developing and eliminating material is used as the recording material.

It is considered that the conventional photocolor developing and eliminating materials which develop colors by the photo-ion dissociation, photo-radical dissociation, photo hydrogen transmission, photosteric structure change, photooxidation or the photoreduction or such like changes.

Examples of the compounds which photocolor-develop and eliminate according to such mechanisms include:

(1) Photo-ion dissociating materials
  (a–1) carbinols such as malachite green carbinol, crystal violet carbinol, phenolphthalene carbinol and the like,
  (a–2) cyanides such as orlamine cyanide, brilliant green cyanide, malachite green cyanide, pararose aniline cyanide, phenol phthalene cyanide and the like,
  (a–3) sulfides such as crystal violet sulfide, malachite green sulfite, methyl violet sulfite, para-rose aniline hydrosulfite, rose-aniline sulfite and the like,
  b. spiropyrans such as 1,3,3,-trimethyl-indolino-benzopyryl spiran and the derivatives thereof,
    bispiro-2,2′-(5,6-benzopyran)
    5,6-benzopyran-2-spiro-2′- β-naphthopyran,
    3,3′-dimethyl-bispiro-2,2′-(β-naphthopyran) and the like,
(2) Photo-radical dissociating materials such as
  a. tetrachloro-1 (4H)+phthalenone, tetrachloro-1(2)+phthalenone and the like,
  b. hexaphenyl bi-imidazolyl, tetra phenyl pyrole dimer and the like
(3) Photo-hydrogen transmitting materials
  a. Anils such as salicylidene aniline, salicylidene meta toluidine, salicylidene orthochloroaniline, salicylidene metaphenylene diamine, 5-bromo salicylidene α-naphthyl amine and the like,
  b. Aromatic nitro compounds such as
    2-(2′,4′-dinitrobenzyl) pyridine,
    4-(2′,4′-dinitrobenzyl) pyridine
(4) Photo steric structure changing materials
  a. Cis-trans transmission materials such as 4,4-dimethyl amino azobenzene, 4-nitro-4-amino-azobenzene, 4,4-diamino stilbene-2,2′-disulfonic acid, diformyl-4,4′-diamino stilbene-2,2′-disulfonic acid and the like
  b. Bianthrones such as xanthylidine anthrone, bianthrone and the like
(5) Photo-oxidizing or photo-reducing materials such as methylene blue and the iron salts, thionine and the iron-salts.

In accordance with this invention, the material having electron or proton donating or accepting properties is added as the color developed state stabilizer to the photocolor developing and eliminating materials, and the color developed state is stabilized by giving and receiving of electron or proton.

The effect of the stabilizer depends on the combination of the photocolor developing and eliminating substance and the stabilizer, concentration, temperature and the properties of the binder to be added for preparing the photosensitive layer or the properties of matrix in which dispersing the photocolor developing and eliminating materials is dispersed when the photocolor developing and eliminating materials are contained in the recording member. Therefore, the specific substances cannot be specified, but the following materials are effective.

As electron donating materials the following can be given.

(1) π-electron donating materials such as
  (a) benzene and alkyl derivatives such as benzene, toluene, xylene and the like.
  (b) polycyclic aromatic compounds such as naphthalene, anthracene, pyrene, tetracene, perylene and the like
(2) n-electron donating materials
  (a) aliphatic amines such as ethyl amine, propyl amine, butyl amine, octylamine, and the like
  (b) aromatic amines such as aniline, dimethylaniline, paraphenylene diamines, and the like As electron accepting materials the following can be given.

(1) quinones such as tetracyano quinodimethane (TCNQ) chloroanil, bromo anil, paraquinone, α-naphthoquinone, β-naphthoquinone, and the like
(2) Nitro compounds such as 2,4-dinitro benzene, 1,3,5-tri-nitrobenzene or the like As proton accepting materials, the following compounds can be given: Acrydine, quinoline, benzylamine, pyridine, diphenylamine, methyl ethyl ether, azobenzene, chlorobenzene, or the like. As the proton donating materials the following compounds can be given: Phenol, aniline, acetic acid, butylalcohol, crotonic acid, benzoic acid or the like.

The above given compounds are effective as the stabilizers, and when combined with the photocolor developing and eliminating materials, the mixture is coated on the supporters such as metal, paper, plastic or the like, or is coated by dispersing the mixture in an appropriate matrix materials to prepare the photosensitive layer of the recording material, and the mixture dispersed in the matrix is formed in the state of film, and the obtained film is used.

Thus obtained recording material can perform color development and color elimination by the irradiation of X-ray, ultraviolet ray, visible ray, infrared ray and various kinds of radiations.

It is not specified which of photocolor developing wave length or photocolor elimination is on the side of long wave length.

As mentioned above, in accordance with the method of this invention, when a stabilizer is contained in photocolor developing and eliminating materials, it is possible to retain lastingly the stable color developing state when the radiation of a specific wave range is given to the materials.

Therefore, when such new materials are used as the main component of the recording material, it is apparent that a recording material which can be widely used is obtained.

For example, phototyping materials, materals for making master sheets for printing, and the recording materials for telecommunication machines and electronic computers or other recording materials.

For example, when mis-typing is made by the erroneous operation in phototyping, or a part of the phototyped copy is changed because of the correction of the original, the photosensitive surface is eliminated, or the separately corrected typing is replaced for the mistyped portion or the portion to be corrected by eliminating the photosensitive surface or phototyping is done anew, when the conventional photosensitive material is used, and therefore the phototyping technique has been remarkably retarded, as is known to those skilled in the art. However, when this invention is employed, such correcting operation can be easily done within a short time by erasing the image by irradiating the radiation for erasing the color of the portion which is to be corrected, and by exposing the corrected image with the radiation for color-development.

Therefore, this invention is very convenient in phototyping systems in Japan where the people use a great number of characters and various kinds of letters. In other applications of this invention, most of the correcting operations which require remarkable experiences can be quickly carried out by making use of the reproduction of the image by means of reexposure, and the erasing through the radiation stimulus. The following are the examples to further illustrate the recording materials to which the stabilizing method of this invention is applied.

EXAMPLE 1

34.4 mg. of malachite green cyanide, 20.4 mg. of tetracyanoquinodimethane, and 10 g. of ethylcellulose were dissolved into 100 g. of alcohol, and the obtained mixture was coated on a transparent glass plate and the coated mixture solution was dried. Thus prepared photosensitive layer developed bluish green at the quantum yield of 1 when irradiated with 313 mμ of mercury lamp ray and the photosensitive layer could be kept in a stable color developing state and then when 365 mμ of mercury lamp ray was irradiated thereto the color thereof was eliminated. The process of color development and color elimination could be repeated over and over again.

EXAMPLE 2

10 g. of salicylidene anil, 9 g. of acrydine were uniformly mixed, and thermally melted, and then cooled off. Thus obtained crystal was crushed, and was finely dispersed into resin, and a film was prepared. Thus prepared recording material developed yellowish orange by the irradiation of 365 mμ of mercury lamp ray, and the color developing state can be stably retained, and then a tungsten lamp was used as the light source, and the erasing of color could be carried out by irradiating the light rays above 420 mμ by using a filter and tungsten lamp as the light source. The process of color development and color elimination could be carried out repeatedly.

The following are the explanations about the embodiments in which the substance of heterogeneous system belonging to another type, or the intermediate substances between the homogeneous system and heterogeneous system were used as the stabilizers.

When the heterogeneous system materials or the intermediate substances between a heterogeneous system material and a homogeneous system material were used as the stabilizers, as explained in detail, in materials having stabilizing properties, such as acidic, basic, ionic, electric charge transmitting properties or high surface energy, should be selected as the surface of the solid particles of said materials, or the surface of said material should be treated so as to give the above mentioned properties to the surface thereof.

In the following, examples of the photocolor developing and eliminating material systems, heterogeneous system material stabilizers having inherently a stabilizing surface, the intermediate substances thereof, heterogeneous system material stabilizers subjected to a stabilizing treatment, intermediate substances thereof, and concrete examples where the above-mentioned materials and stabilizers are employed, are shown.

Representative and preferable photocolor developing and eliminating materials in this invention are as follows.

A. Spirans such as
 1,3,3-trimethylindolino 6′-nitrobenzo pyrylspiran
 6′-nitro-8′-methoxy-1,3,3-trimethyl indolino-6′-nitrobenzopyrylspiran
 6′-nitro-8′-fluoro-1,3,3-trimethylindolino-6′-nitrobenzopyrylspiran
 6′-8′-dibromo-1,3,3-trimethylindolino-6′-nitrobenzopyrylspiran and the combinations of spiropyran compounds and hydrogen donors, i.e., proton donating substances such as phenols, organic carboxylic acids, weak inorganic acids and the like.

B. Anils such as
 salicylidene-aniline,
 salicylidene-m-toluidine,
 salicylidene-p-toluidine,
 salicylidene-o-chloroaniline,
 salicylidene-p-bromoaniline,
 salicylidene-m-bromoaniline,
 salicylidene-p-bromoaniline,
 salicylidene-m-phenylenediamine,
 salicylidene-o-anisidine,
 salicylidene-p-anisidine,
 salicylidene-m-aminobenzoic acid,
 salicylidene-p-aminobenzoic acid, and the combinations of anil compounds and proton accepting materials such as acrydine, quinoline and the like, C. Semicarbazones such as
 cinnamic aldehyde semicarbazone,
 m-methoxy cinnamic aldehyde semi-carbazone,
 o-methoxy cinnamic aldehyde semi-carbazone,
 o-methoxy cinnamic aldehyde phenyl semi-carbazone, and the like.

As the examples of the heterogeneous system material having the surface for stabilizing the specific state of photocolor developing and eliminating materials, the following can be given:

(1) As solid materials, organic and inorganic compounds having acidic surfaces, basic surfaces, ionic solid, electric charge transmitting properties, or high surface energy, and paper, fiber, wood, porcelain, metal, glass, synthetic fiber, resin film or the like.

(2) As gel form materials, for example, substances as shown below or inorganic sol form substances and organic gel form substances containing the below given individual materials or the like.

The inventors of this invention have found out the fact that it is more effective in some cases to treat the surface by using the substances having acidic, basic, ionic, electric charge transmitting, or having high surface energy.

In the following, examples of the substances are shown below.

(1) As high polymers:

| | |
|---|---|
| nitrocellulose | polyvinyl alcohol |
| cellulose acetate | polyvinyl chloride |
| ethyl cellulose | polyacrylonitrile |
| polyethylene | polymethylmethacrylate |
| polystyrene | gelatin |
| polyvinyl acetate | |

(2) As the solid acid, Lewis solid acid is used, and the example of Lewis solid acid are as follows.

natural clay minerals

| | |
|---|---|
| acidic terra abla, | fuller's earth |
| clarite | montmorillonite |
| bentonite | fluoridine |
| kaolin | |

solidified acids such as those obtained by adhering sulfuric acid, phosphoric acid onto silica gel or alumina
phosphoric acid obtained by using quartz sands as carrier
the calcined compounds of diatomaceous earth and phosphoric acid
cation exchange resin
silica-alumina, silica-magnesia, silica-boria
inorganic chemicals ZnO, $Al_2O_3$, $TiO_2$, $CeO_2$, $As_2O_3$, $V_2O_5$, $SiC_2$, $Sb_2O_5$, $CaSO_4$, $MnSO_4$, $CuSO_4$, $NiSO_4$, $CoSO_4$, $CdSO_4$, $SrSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_2$, $Ca(NO_3)_2$—$4H_2O$, $Bi(NO_3)_3$—$5H_2O$, $Zn(NO_3)_3$—$6H_2O$, $Fe(NO_3)_3$—$9H_2O$, $CaCO_3$, Zr phosphate, Ti phosphate, $AlPo_4$, $PbCl_2$, Hg $Cl_2$, $CuCl_2$, $AlCl_3$, $SnCl_2$, $CaCl_2$, AgCl, $H_2WO_4$, $AgClO_4$, ZnS, CaS, $Mg(ClO_4)_2$ (3) Lewis solid base is generally used as the solid base and the examples of the Lewis solid base are as follows, Inorganic chemicals such as CaO, MgO, BeO, $SiO_2$, ZnO, $Na_2CO_3$, $K_2CO_3$, $KHCO_3$, $(NH_4)_2CO_3$, $BaCO_3$, $KNaCO_3$, $Na_2WO_4$—$2H_2O$, KCN
Those prepared by adhering caustic soda to silica gel, and those prepared by adhering potassium hydroxide
anion exchange resins
nitrous oxide activated carbon, ammonia activated carbon (4) As the sizing agents, rosin, emulsified wax, reinforced sizing agent, bitumen emulsifier, latex, silicon and the like.

(5) As the examples of ionic solids, the following can be given.

sodium chloride,
potassium chloride,
magnesium chloride, or those having about 50% of ion-crystallinity As the means for contacting photocolor developing and eliminating materials above or the mixture thereof with electron or proton donating or accepting stabilizers to the above mentioned surface, the following can be given.

(1) As the liquid matrix, such as benzene,
toluene,
xylene,
cyclohexane,
normal hexane,
butylalcohol,
ethyl alcohol,
isopropyl alcohol
dimethylformamide
acetone
methyl alcohol
ethyl acetate
ethyl ether
pyridine
trichlene and the like, or the homologues thereof.

(2) As the solid matrix, the following examples can be given.

Condensate type polymers such as polyamide type resin,
N-alkyl polyamide,
polyimide,
polypeptide,
polyester type resin,
polycarbonate resin,
polyacid anhydride resin,
polyether type resin, and the like.

As polymerized type polymers, the following examples can be given.

aliphatic hydrocarbon type vinyl resin,
aromatic hydrocarbon type vinyl resin (polystyrene type)
vinyl alcohol type resin,
nitrile type resin,
acryl type resin,
methacryl type resin and the like As the examples of such high polymer substances as above the following can be given.

nitrocellulose,
cellulose acetate,
ethyl cellulose,
polyethylene,
polystyrene,
polyvinyl acetate,
polyvinyl alcohol,
polyvinyl chloride,
polyacrylonitrile,
vinyl chloride,
polymethyl methacrylate,
and gelatine and the like.

In addition to the above, oligomer and other single molecular organic substances having excellent adherability can be used.

It is also possible to use synthetic photo-color developing materials obtained by chemically bonding photocolor developing materials to high polymer or oligomer.

The following are the concrete examples to further illustrate this invention.

However, a great number of modifications within the technical scope of this invention may be carried out as a matter of course.

EXAMPLE 3

20 mg. of 6'-nitro-1,3,3-trimethylindolinobenzopyrylspiran was dissolved into 10 ml. of toluene, and thus obtained mixture solution was coated uniformly on the art-treated surface of one sided art paper whose thickness is about 80μ in such a manner that the coating could become from 1 to 2μ to prepare the photocolor developing and eliminating recording material.

EXAMPLE 4

20 mg. of 6'-nitro-1,3,3-trimethylindolinobenzopyrylspiran was dissolved into 10 ml. of toluene, and thus obtained mixture was coated on an aluminum plate whose thickness is about 100μ in such a manner that the thickness of the coating could become from 1 to 2μ to prepare a photocolor developing and eliminating recording material.

EXAMPLE 5

5 g. of ethyl cellulose was mixed along with 500 mg. of ethyl alcohol and the mixture was sufficiently stirred, and after dissolving the same sufficiently the mixture was coated on an art paper, and the coating was dried.

Thereafter, 20 mg. of 6'-nitro-1,3,3-trimethylindolinobenzopyrylspiran was dissolved into 10 ml. of toluene, and the mixture was coated on the art paper having been coated with the above prepared ethyl cellulose in such a manner that the thickness of the coating became as thick as 0.5 to 1μ to prepare a photocolor developing and eliminating recording matter.

EXAMPLE 6

20 mg. of 6'-nitro-1,3,3-trimethylindolinobenzopyrylspiran was dissolved into 10 ml. of toluene, and the obtained mixture was coated on a polystyrene film whose thickness is 100μ to prepare a photocolor developing and eliminating recording matter.

In the above given examples from 3 through 6, the photocolor developing and eliminating recording material is subjected to exposure and fixation before or after drying treatment as is described in the following paragraphs.

The above prepared photosensitive recording material is subjected to the exposure by using the ultra violet ray obtained by using the light from a 500 w. high pressure mercury lamp and the glass filter (UV–D25) at a distance of 10 cm. from the light source for about 15 seconds in the Examples from 3 to 5, and for about one minute in Example 4, and for about 30 seconds in Example 6 and the photosensitive recording material developed reddish purple and retained stable clear color for more than 20 minutes.

When a negative image is placed between the photosensitive member and the light source, the corresponding positive photocolor image could be obtained.

When thus colorized photosensitive member was subjected to the irradiation of the visible ray obtained by using a glass filter (UV–39) against the light from the light source for 30 seconds, and the colorizing state was perfectly eliminated. The color developing and eliminating process could be repeated over and over again.

The photosensitive member in the colorized state was treated with 1% caustic soda aqueous solution, the developed color could be fixed.

When thus fixed color image was treated with 5% hydrochloric acid alcohol aqueous solution, and the above mentioned treatment with visible light was carried out, and the fixed state was turned back to the photocolor developing and eliminating state.

EXAMPLE 7

5 g. of kaolin, and 15 ml. of ethylalcohol were sufficiently mixed by using an ultrasonic wave stirrer for about 5 minutes, and the mixture was coated on a one sided art paper whose thickness is 80μ in such a manner that the thickness of coating could become about 10μ thick.

EXAMPLE 8

5 g. of acidic terra abla, and 15 ml. of ethylalcohol were sufficiently mixed for about 5 minutes by using an ultrasonic wave stirrer, and the obtained mixture was coated on two sided art paper (whose thickness is 80μ)

in such a manner that the thickness of the coating could become as thick as about 10μ.

EXAMPLE 9

5 g. of kaolin, 0.02 g. of ethyl cellulose, 15 ml. of dioxane were sufficiently mixed for about 10 minutes by using an ultrasonic wave stirrer, and the obtained mixture was coated on two sided art paper whose thickness is about 100μ in such a manner that the thickness of the coating could become about 15μ.

EXAMPLE 10

5 g. of bentonite, and 15 ml. of ethyl alcohol, were sufficiently mixed for about 5 minutes by using an ultrasonic wave stirrer, and the obtained mixture was coated on an aluminum plate of 100μ thick in such a manner that the thickness of the coating could become about 10μ.

Photocolor developing and eliminating material was coated on the surface prepared in Examples 7 through 10 in the same manner as in Examples 3 through 6, and photocolor developing and eliminating recording member can be obtained.

EXAMPLE 11

5 g. of kaolin, 20 ml. of ethyl alcohol, and 20 mg. of 6′-nitro-1,3,3-trimethylindolinobenzopyrylspiran were sufficiently mixed for about 5 minutes by using an ultrasonic wave stirrer, and then the obtained mixture was coated on an art paper, aluminum plate or a glass in such a manner that the coatings could become as thick as about 10μ.

As described so far in the preceding paragraphs, the resulting stabilized color developed image on the recording material was fixed as a permanent image, and the fixed image is turned back to the original image, and the following is an explanation about the method therefor.

In accordance with this invention, as described above, the colorized image is retained as a permanent latent image by the treatment by basic material or anion as the stabilizer, and then the fixed image is turned back to the photoreversible colorized image by treating the fixed image with acidic material or cation as a restoring agent.

As the examples of the fixing agents for fixing the colorized image, the following can be given, inorganic base such as sodium hydroxide, potassium hydroxide and the like, and ammonia, and amino compounds such as ethylamine, propyl amine, butyl amine and the like, and potassium cyanide, sodium cyanide, or such like salts or a weak acid and a strong base, Brønsted base and the salts thereof may be used.

As the restoring agents, for example, organic acids such as acetic acid, benzoic acid and the like, and inorganic acids such as hydrochloric acid, nitric acid and the like, Lewis solid acid and such like acids may be used.

The recording material is treated with these in liquid state of gaseous state.

The following is an explanation about the examples of the fixing of the photosensitive material and the method for restoring the photocolor development and elimination property, but it is a matter of course that a great number of modifications can be done within the scope of the invention.

EXAMPLE 12

68 mg. of 6′-nitro-1,3,3-trimethylindolinobenzopyrylspiran, 36 mg. of p-nitrophenol, 10 g. of polystyrene were dissolved in 60 g. of xylene, and the mixture was coated on a transparent glass plate and dried to prepare a recording material.

Thus obtained photosensitive layer was developed into red color by irradiating ultraviolet ray by using a 250 w. ultra high pressure mercury lamp, and Toshiba Filter UVD–25 at a distance of 10 cm. from the light source for 30 seconds, and it was kept in a stable colorized state for about 60 hours.

Next, by using a Toshiba Filter UV–39, visible light was irradiated thereto for 30 seconds at the same distance from the light source, and the colorized state was perfectly eliminated, and the color developing and eliminating process could be carried out repeatedly.

The recording material in the colorized state was treated with 10% ammonia alcohol aqueous solution (3 parts by volume of ethyl alcohol, and 7 parts by volume of water), and the developed color could be fixed.

Thus fixed color was treated with 5% hydrochloric acid alcohol aqueous solution and the fixed state was restored to the original photocolor developing and eliminating state.

EXAMPLE 13

59 mg. of 6′-nitro - 1,3,3 - trimethylindolinobenzopyrylspiran and 10 g. of ethyl cellulose were dissolved into ethyl alcohol aqueous solution (containing 9 parts by volume of ethyl alcohol and one part by volume of water), and the obtained mixture was coated on a glass plate, and dried, and thereafter the coating was peeled off, and a transparent film was obtained.

Thus obtained film was subjected to color development into purplish color by the irradiation of ultraviolet ray obtained by the combination of a 250 w. ultra high pressure mercury lamp and Toshiba glass Filter UV D–25 at a distance of 10 cm. from the light source, and the colorized state was retained at a room temperature for more than 20 minutes in a dark place, and when it was irradiated with visible light, it was eliminated right away.

Thus obtained colorized state was fixed as yellow color developed state by the treatment of 5% sodium hydroxide alcohol aqueous solution.

The fixed colorized state was treated with 10% acetic acid alcohol aqueous solution, and it was stabilized in yellowish orange color developed state, but when visible light was irradiated thereto by using the same light source and Toshiba Filter UV–39 at the same distance, it was eliminated and turned back to the original state.

It is possible to carry out the process of color development-fixation-stabilization-elimination can be repeated substantially without any fatigue.

The following is an explanation about the embodiment of a color recording member in which the new photocolor developing and eliminating material for forming a color image directly on the recording material is used.

The photocolor developing and eliminating materials used for the color recording member of this invention are preferably spiropyran compounds as given above, or the mixture of the above given compounds and the hydrogen donating materials i.e. proton donating materials, such as phenols, as the stabilizers, anils or the mixture of anils and proton accepting materials such as quinoline, and semicarbazones.

Such photocolor developing and eliminating materials have respectively the specific absorption wave length ranges.

Figure 5A:
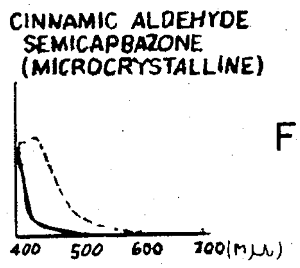
FIG. 5 is a diagram showing the absorption spectrum curve of the state of color development of the respective kinds of photocolor developing materials used in this invention.
Figure 5B:
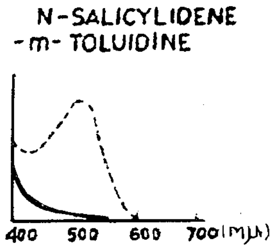
Figure 5C:
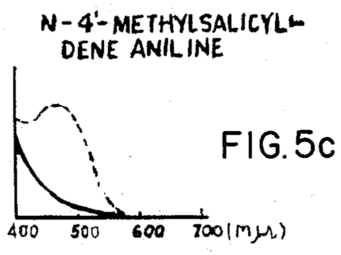

This is explained in accordance with FIG. 5. In FIG. 5, the horizontal axis represents wave length of the radiation to be irradiated onto the photocolor developing and eliminating material, and the vertical axis represents the ratio of absorption. For example, cinnamic aldehyde semicarbazone in FIG. 5(*a*) has the absorption spectrum range (shown by the solid line in FIG. 5) in such a wave length range that is shorter than 400 mμ i.e., in ultraviolet ray portion.

When ultraviolet ray is irradiated onto this compound, the absorption range is generated in the visible range (the curve shown by the dotted line in FIG. 5).

In FIG. 5 almost blue absorption is shown, and therefore said material develops the complementary color of blue color.

In the same manner as is apparent from the diagrams from FIG. 5(*b*)–(*d*), N-salicylidene-m-toluidine, N-4′-methylsalicylidene aniline, N-salicylidene aniline and the like have the respective specific absorption wave length ranges in ultraviolet ray portions, and absorb the light of said wave length ranges, and come to have the specific absorption wave length ranges in the respective visible ranges, and the respective complementary colors are developed.

The color recording member of this invention can be prepared by dispersing at least one kind of the above mentioned photocolor developing and eliminating materials therein in the form of matrix, and as the high polymers as the dispersing agents, the following materials can be given.

1. As the examples of condensate type high polymers;

polyamide type resin,
N-alkylpolyamide,
polyimide,
polypeptide,
polyester type resin
polycarbonate resin,
polyacid anhydride resin,
polyether type resin 2. As polymer type high polymers;

aliphatic hydrocarbon type vinyl resin,
aromatic hydrocarbon type vinyl resin (polystyrene type),
vinyl alcohol type resin,
nitrile type resin,
acryl type resin,
methacryl type resin, As the examples of such high polymer materials as given above, the following can be given;

| | |
|---|---|
| nitrocellulose | polyvinyl alcohol |
| cellulose acetate | polyvinyl chloride |
| ethyl cellulose | polyacrylonitrile |
| polyethylene | polyvinyl chloride |
| polystyrene | polymethylmethacrylate |
| polyvinyl acetate | gelatin and the like |

In addition to the above, oligomer or other monomer organic substances having excellent bonding property may be used.

It is also possible to use synthetic photocolor developing materials prepared by chemically bonding photocolor developing materials to high polymers or oligomers.

The examples of liquid dispersing agents include benzene, toluene, xylene, cyclohexane, normal hexane, butyl alcohol, ethyl alcohol, methyl alcohol, isopropyl alcohol, dimethyl formamide, acetone, ethyl ether, ethyl acetate and the homologues.

When photocolor developing and eliminating materials are dispersed into a dispersing agent in the form of matrix, the absorption wave length ranges in visible light range at the color developed state depend on kinds of the dispersing medium.

This is explained in accordance with the diagrams FIG. 5(*e*), (*f*), (*g*), (*h*).

For example, when 8′-carboxy-1,3,3-trimethylindolinobenzopyrylspiran is used as the photocolor developing and eliminating material, and acetone solution, methyl alcohol solution, and propyl alcohol solution are used as the dispersing medium as is shown in the diagrams FIG. 5 (*e*–1) through (*e*–3), the absorption wave length of the visible range comes to be different in the color developed state. In other words, in the solution of an acetone dispersing agent the absorption wave length range is present in about green color portion (see the diagram (*e*–1)), and in methyl alcohol dispersing agent, the absorption wave length range is present in about blue portion (see the diagram (*e*–2)).

The color recording member of this invention may be prepared in the following manner.

1. One or more than one layer of photosensitive component or one or more than one kind of photosensitive component (i.e., photocolor developing and eliminating material or the mixture of the same and the stabilizers) is uniformly coated on the transparent or non-transparent supporter.

2. One or more than one layer of photosensitive component or one or more than one kind of photosensitive component is uniformly dispersed into the dispersing medium without a support to prepare the photosensitive material.

The following is an explanation about the process for recording the images.

1. When photocolor developing and eliminating materials containing photochromic substances are used: when spiropyran compounds or the mixture of spiropyran compounds and stabilizers, are used, the recording material is, in advance, wholly exposed to photocolor developing light such as ultraviolet ray to make it sensible to the light of the whole visible range, and the resulting recording material is subjected to the color image exposure, and the recording is carried out by using a photocolor eliminating process. It is possible to repeat a step of erasing the recorded image by light, a step of restoring the same to the original totally colorized state, and a step of recording again.

By treating the photosensitive materials which are prepared by the combination of spirans by an aliphatic amine such as hexyl amine or a strong alkali such as caustic potassium, the image thereon is permanently stabilized in the form of yellow latent image, and when it is treated with an organic acid and an inorganic acid, it may be turned back to the original color image.

2. The case in which a thermal color developing and photocolor eliminating materials containing photochromic substances:

(1) The combinations of the above given spirans with phenols, organic carboxylic acids, and strong acids (mineral acids)

(2) 1,3,3 - trimethylindolino - 8′ - carboxybenzopyrylspiran and semicarbazones (refer to item C above)

When the group of materials in (1) and (2) above is used, ultraviolet ray and heat are used in advance to the effect that the color is developed so as to make the recording member sensible to the whole visible range, and then a color image exposure is carried out, and the elimination is carried out in accordance with the exposed portion, and a positive color image is recorded.

Thus obtained recorded image can be turned back to the original totally colorized state by means of heat and ultraviolet ray irradiation to the effect that the image can be erased, and this operation can be carried out repeatedly.

When the photosensitive materials obtained by the combination of spirans, are used, the yellow latent image can be permanently stabilized by treating the same with amine such as hexyl amine or a potassium hydroxide solution. When it is further treated with an acid, it can be turned back to the original color image.

The following are the concrete examples of this invention. It is a matter of course that a great number of other modifications within the scope of the technical idea of this invention can be carried out.

First, the following Example 14 refers to an example of a color recording member having the absorption range covering the whole visible light range prepared by selecting appropriately the dispersion medium and the additive into which one and the same photocolor developing and eliminating material is dispersed and incorporating them to the photosensitive layer.

EXAMPLE 14

A

| | |
|---|---|
| 1,3,3-trimethylindolino-6′-nitrobenzopyrylspiran ----mg-- | 60 |
| Polystyrene ----g-- | 10 |
| Xylene ----cc-- | 50 |

B

| | | |
|---|---|---|
| 1,3,3-trimethylindolino-6′-nitrobenzopyrylspiran | mg | 60 |
| p-Nitrophenol | mg | 40 |
| Polystyrene | g | 10 |
| Xylene | cc | 50 |

C

| | | |
|---|---|---|
| 1,3,3-trimethylindolino-6′-nitrobenzopyrylspiran | mg | 60 |
| Malonic acid | mg | 40 |
| Polystyrene | g | 10 |
| Benzene | cc | 50 |

The respective mixtures A, B and C were coated sequentially on glass plates uniformly and the resulting coating was dried, and a three layer transparent film was prepared and thus prepared transparent film was used as the photosensitive material.

Or, the mixtures A, B, and C were separately sprayed on a supporter such as polyester transparent support or a paper to prepare a photosensitive material.

The color image recording was carried out in such a manner that the above prepared photosensitive materials were placed at a distance of about 50 cm. from the light source and by using a 500 w. mercury lamp as the light source and a visible light cut filter (Toshiba glass Filter UV–D 25) the total exposure was carried out for 10 seconds to have the photosensitive material sensitized in the whole visible light range, and then, the color image was exposed from the distance of 50 cm. for 10 seconds by using a 250 w. tungsten lamp, the color developing material was eliminated of the colors corresponding to the color developing material, and a positive color image could be obtained.

Next, when the positive color image was dipped in a 10% aqueous solution of potassium hydroxide, the color image was changed into yellow latent image and is stabilized permanently. When it was again dipped in the solution of acetic acid, it could be again changed into color image.

Figure 1:
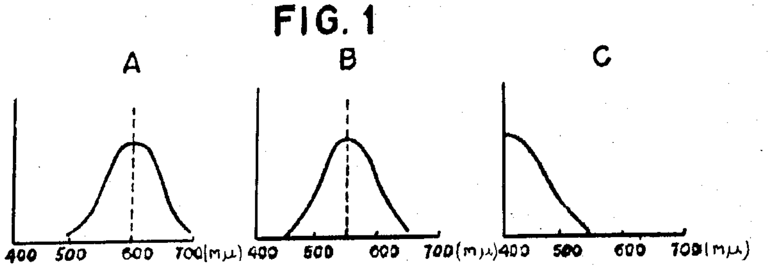
FIG. 1 is the respective absorption spectrum curves of the three kinds of photosensitive components which are used for the color image recording material of this invention.
Figure 2:
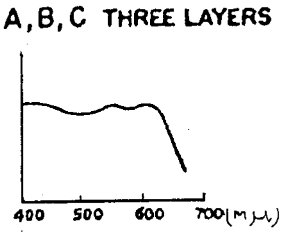
FIG. 2 is the absorption spectrum of the photosensitive matter composed of the three kinds of photosensitive components.

FIG. 1 shows the absorption spectra of the respective photosensitive materials A, B, and C of the above example (the horizontal axis showing the wave length λ by mμ) and FIG. 2 shows the absorption spectrum of the photosensitive material composed of the three layers A, B and C as mentioned above.

Figure 3:
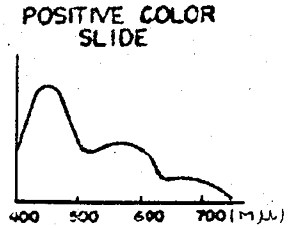
FIG. 3 is the diagram showing the spectrum distribution of the positive color slide which is the original image.
Figure 4:
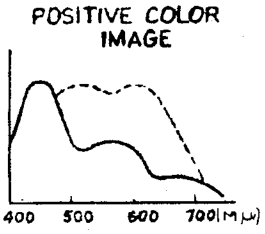
FIG. 4 is a diagram showing the spectrum distribution of the color image obtained by exposing the positive color slide of FIG. 3.

When the positive color slide of the spectrum distribution shown in FIG. 3 was exposed in the same manner as above, the positive color image of FIG. 4 could be obtained.

The following Example 15 refers to an example of a color recording member comprising a photosensitive layer including more than one of photocolor developing and eliminating materials uniformly mixed and made into one layer.

EXAMPLE 15

A

| | | |
|---|---|---|
| N-salicylidene aniline | g | 10 |
| Acrylidine | g | 10 |

B

| | | |
|---|---|---|
| 8′ - carboxyl - 1,3,3 - trimethylindolinobenzopyrylspiran | mg | 60 |
| Ethylcellulose | g | 10 |

C

| | | |
|---|---|---|
| 6′-nitro-8′-methoxy-1,3,3-trimethylindolinobenzopyrylspiran | mg | 60 |
| Polystyrene | g | 10 |

The following is an explanation about the method for preparing the A, B, and C.

A: 10 g. of N-salicylidene aniline and 10 g. of acrylidene are thermally melted at 100° C., and the hot mixture is abruptly cooled off, and then finely crushed.

B: 60 mg. of 8′-carboxy-1,3,3-trimethylindolinobenzopyrylspiran and 10 g. of ethyl cellulose are dissolved into 50 cc. of alcohol and then the mixture solution is finely crushed after having dried the same.

C: 60 mg. of 6′-nitro-8′-methoxy-1,3,3-trimethylindolinobenzopyrylspiran and 10 g. of polystyrene are dissolved into 50 cc. of xylene, and the powders A and B are dispersed thereinto and the obtained mixture is coated on a paper support and the coating is thermally dried to prepare a photosensitive material.

The color image recording material was totally irradiated for 10 seconds with ultraviolet ray by using a 500 w. mercury lamp and thermal color-development was carried out for about one minute at a temperature ranging from 50° C. to 60° C. by using a heater or heat ray so that the whole visible range could be sensitized.

Next, the color image was exposed for 10 seconds at a distance of 50 cm. by using a positive color slide and a 250 w. tungsten lamp, and the color elimination was carried out in accordance with the sensitized portion, and a positive color image could be recorded.

Thus obtained recorded image can be erased by turning the same into the original colorized state by heat and the irradiation of ultraviolet ray, and this operation can be effected repeatedly.

As described so far, the structure of the color recording material of this invention is that a photosensitive material is dispersed into a transparent or semi-transparent dispersing material, and the photosensitive material is used in the form of film or plate, or the photosensitive material is made into a single layer or multi-layer, and is adhered on a plane support such as film, paper, metal, or glass.

In addition to the above, photosensitive material is used in the form of thin layer on the support without using the dispersing agent, and a transparent high polymer film is coated on said thin film to make the color recording material of this invention.

In the color recording member of the following Example 15A, more than one of photocolor developing and elminating materials are used and each of them has each individual absorption range in the color-developed state, and further the dispersion medium and the additive are appropriately selected and incorporated to a photosensitive layer in such a manner that the absorption range covers the whole visible light range.

EXAMPLE 15A

A

| | | |
|---|---|---|
| 1,3,3-trimethylindolino-6′-nitrobenzopyrylspiran | mg | 60 |
| Malonic acid | mg | 40 |
| Polystyrene | g | 10 |
| Benzene | cc | 50 |

B

| | | |
|---|---|---|
| 8′-carboxy-1,3,3-trimethylindolinobenzopyrylspiran | mg | 60 |
| Ethylcellulose | g | 10 |

C

| | | |
|---|---|---|
| 6′-nitro-8′-methoxy-1,3,3-trimethylindolinobenzopyrylspiran | mg | 60 |
| Polystyrene | g | 10 |

A, B, and C above are sequentially coated on a glass plate uniformly and dried to form a three-layer transparent film which is used as a photosensitive material. Or, A, B and C are separately scattered on a support such as a polyester transparent support or paper to form a photosensitive material. Color image recording is carried out by using the resulting photosensitive material in a recording member. The whole surface of the recording member is exposed to a ultraviolet light obtained by passing a light from a 500 w. mercury lamp through a visible light cut filter (Toshiba Glass Filter UV–D25) for 10 seconds at a distance of about 50 cm. from the light source to sensitize the recording member for the whole visible light range. The recording member is then exposed to a color image of a positive color slide by using a tungsten lamp (250 w.) at a distance of 50 cm. for 10 seconds and the color-developed member corresponding to each color is eliminated to form the positive color image.

Further, the recording member thus treated is soaked in a 10% solution of potassium hydroxide to change the color image to a yellow latent image which is everlastingly stabilized. When the latent image is treated with an acetic acid solution to produce the color image again.

The following is an explanation about the concrete examples of a new method for optionally forming normal image and a reversal image, in accordance with the demand, by using a recording material in which photocolor developing and eliminating materials are used.

In regard to the photocolor developing and eliminating materials, stabilizers, dispersing mediums and such like recording materials which were used in the following examples, those which have already been given in the preceding paragraphs were used in the following examples.

EXAMPLE 16

68 mg. of 6'-nitro-1,3,3-trimethylindolinobenzopyrylspiran, 36 mg. of p-nitrophenol, and 10 g. of polystyrene were dissolved into 50 g. of xylene, and the obtained mixture was coated on a transparent glass plate, and the coating was dried, and peeled off to obtain a transparent film, and this transparent film was used as the recording material.

Thus obtained photosensitive layer was subjected to the irradiation of ultraviolet ray for 30 seconds by using a 250 w. ultra-high pressure mercury lamp and a Toshiba Glass Filter UVD-25 at a distance of 10 cm. from the light source, and thus the photosensitive layer presented red color, and the photosensitive layer was kept at the stable colorized state for about 60 hours.

Next, visible light was irradiated for 30 seconds at the same distance from the light source by using a Toshiba Glass Filter UV-39, and the colorized state was perfectly eliminated. The process of color development and elimination can be effected repeatedly.

The recording material which was in the above mentioned colorized state was treated with 10% ammonia alcohol aqueous solution (containing 3 parts by volume of ethyl alcohol and 7 parts by volume of water), thereby the developed color could be fixed.

When thus obtained fixed color image was treated with 5% hydrochloric acid alcohol aqueous solution, the fixed state was turned back to the original photocolor developing and eliminating state.

The ultraviolet ray obtained by passing the light of a 250 w. ultra-high pressure mercury lamp through a Toshiba Glass Filter UVD-25 was irradiated for about 30 seconds at a distance of about 10 cm. from the light source through the same filter as above, and thermal color development was carried out by a heater or heat ray at a temperature from 50° C. to 60° C. for one minute so that the whole visible range was sensitized.

Next, a positive image was exposed for 10 seconds at a distance of 30 cm. to the light source composed of a 250 w. tungsten lamp, and color eliminated positive image was formed in accordance with the exposed portion.

Thus obtained recorded image was turned back to the original totally colorized state by heat and the irradiation of ultraviolet ray to the effect that the image could be erased, and this operation could be carried out repeatedly.

When the photosensitive material obtained by the combination of spirans is treated with amines such as hexylamine or a solution of potassium hydroxide, thereby the permanent stabilization of yellow latent image could be attained.

Thus obtained latent image could be turned back to the original image by treating the same with acid.

EXAMPLE 17

A

| | |
|---|---|
| 1,3,3-trimethylindolino-6'-nitrobenzopyrylspiran mg. | 60 |
| Polystyrene g. | 10 |
| Xylene cc. | 50 |

B

| | |
|---|---|
| 1,3,3-trimethylindolino-6'-nitrobenzopyrylspiran mg. | 60 |
| p-Nitrophenol mg. | 40 |
| Polystyrene g. | 10 |
| Xylene cc. | 50 |

C

| | |
|---|---|
| 1,3,3,-trimethylindolino-6'-nitrobenzopyrylspiran mg. | 60 |
| Malonic acid mg. | 40 |
| Polystyrene g. | 10 |
| Benzene cc. | 50 |

A, B, and C were respectively coated uniformly on a glass plate, and then the coating was dried, and a three layer transparent film was prepared. Thus prepared transparent film was used as the photosensitive material.

Or, A, B, and C were separately coated on a polyester transparent support, or paper or such like support by spraying the same to prepare the photosensitive materials.

The color image recording was carried out in such a manner that the above prepared photosensitive materials were subjected to the total exposure for 10 seconds with ultraviolet ray obtained by using a 500 w. mercury lamp and a visible light cut filter (a Toshiba Glass Filter UV-D25) at a distance of about 50 cm. from the light source, so that the whole visible range was sensitized, and then a color image was exposed thereonto for 10 seconds at a distance of 50 cm. from the light source of a 250 w. tungsten lamp, and the color developed materials corresponding to the respective colors were eliminated of the colors, and a positive color image could be obtained. The positive color image was dipped in a 10% aq. solution of potassium hydroxide and then was changed to a yellow latent image and thereby permanently stabilized. Thus stabilized image was changed into a color image by dipping the same in a solution of acetic acid.

EXAMPLE 18

A

| | |
|---|---|
| N-salicylidene aniline g. | 10 |
| Acrylidine g. | 10 |

B

| | |
|---|---|
| 8'-carboxyl-1,3,3-trimethyl-indolinobenzopyrylspiran mg. | 60 |
| Ethylcellulose g. | 10 |

C

| | |
|---|---|
| 6' - nitro-8'-methoxy - 1,3,3 - trimethylindolinobenzo-spiran mg. | 60 |
| Polystyrene g. | 10 |

An explanation about the method for preparing the A, B, and C is described below.

A: 10 g. of N-salicylidene aniline, 10 g. of acrylidine are thermally melted, rapidly cooled, and then finely crushed.

B: 60 mg. of 8'-carboxy-1,3,3-trimethylindolinobenzopyrylspiran and 10 g. of ethylcellulose were dissolved into 50 cc. of alcohol, and then the mixture solution was dried into powder.

C: 60 mg. of 6'-nitro-8'-methoxy - 1,3,3 - trimethylindolinobenzopyrylspiran and 10 g. of polystyrene were dissolved into 50 cc. of xylene, and then the powders A and B were dispersed therein, and the mixture was coated on a paper support, and then the coating was dried by heating and the photosensitive material was prepared.

The color image recording was carried out in such a manner that the whole surface was subjected to the irradiation of ultraviolet ray for 10 seconds by using a 500 w. mercury lamp, and the thermal color-development was carried out at a temperature from 50° C. to 60° C. for one minute by using a heater or heat ray, and the whole visible range was sensitized. Next, a color image was exposed for 10 seconds by using a 250 w. tungsten lamp at a distance of 50 cm. from the light source, and the color was eliminated in accordance with the exposed portion, and a positive color image was recorded. Thus obtained positive color image could be turned back to the totally colorized state by heat and the irradiation of ultraviolet ray to the effect that the image could be erased, and this operation could be carried out repeatedly.

Next, the following is an explanation in accordance with the attached diagrams about the concrete examples of the new image forming method in which a screen prepared from the photocolor developing and eliminating material is used.

First, the following are the examples for forming the screen of the photocolor developing and eliminating materials applied to the method of this invention.

(a) 60 mg. of 1,3,3-trimethylindolino-6′-nitro-benzopyrylspiran is dissolved into 50 ml. of toluene, and thus obtained mixture is uniformly coated on a high quality art paper and a screen was obtained.

(b) 60 mg. of 1,3,3-trimethylindolino-6′-nitro-benzopyrylspiran and 2 g. of polystyrene are dissolved into 50 ml. of toluene, and thus obtained mixture is uniformly coated on a cotton cloth to form a screen.

The following is an explanation in accordance with the diagrams from FIG. 6 through FIG. 8 about the concrete examples in which the above prepared screen were used.

EXAMPLE 19 (FIG. 6)

The screen 16 prepared by using the photocolor developing and eliminating material prepared in accordance with (a) or (b) above, was used.

The ultraviolet ray obtained by passing the light from the light source 11 (500 w. ultra-high pressure mercury lamp) through a visible light cut filter 12, was projected to a negative slide or negative cine film 13, and the light having passed therethrough was condensed by the condenser lens 14, and was sent to the projector lens 15, and the image was projected on the screen 16.

Light passed through the bright portion or the transparent portion of the negative film 13 and the color was developed at the portion corresponding to the screen 16 and the reversal projected image was obtained on the negative film. In particular, in carrying out a slide projection, it is effective to apply visible light from the light source 11 when the image is changed in order to quicken the elimination of the after image as the image to be projected is exchanged.

In carrying out the slide projection, when the degree of the projection on the screen surface 16 arrives at a certain degree, the projected image can be retained even when the excited light is not applied further, and therefore it is not necessary to carry out continuous exposure.

EXAMPLE 20 (FIG. 7)

The ultraviolet ray obtained by passing the light from the two light sources 27 (respectively two 250 w. ultra-high pressure mercury lamps) through the visible light cut filter 28, was projected from the front side onto the screen 26 prepared in accordance with (a) or (b) above, and the color was developed on the whole surface of the screen 26.

The visible light obtained from a 250 w. tungsten lamp 21 was projected onto a positive slide or positive cine film 23, and the light having passed therethrough was condensed by a condenser lens 24, and was sent to the projector lens 25, and the image was projected onto the screen 26.

The portion of the screen where the visible light had arrived was eliminated of the color, and the positive image corresponding to the positive film was obtained.

In erasing the image, only ultra-violet ray alone excluding visible light was irradiated, it was reverted to the totally colorized state.

EXAMPLE 21 (FIG. 7)

The ultraviolet ray light sources $27_1$ and $28_1$ for totally coloring the whole surface of the screen in Example 20, were placed behind the screen as is shown by the dotted line of FIG. 7, and the irradiation was carried out from behind. The positive image projection was carried out in the same manner as in Example 20.

EXAMPLE 22 (FIG. 8)

Preparation of screen 60 mg. of 1,3,3-trimethyl-indolino-8′-carboxy-benzopyrylspiran was dissolved into 10 ml. of water, and the resulting solution was added to the solution obtained by dissolving 10 g. of polyvinyl alcohol into 40 ml. of water, and the whole mixture was sufficiently stirred.

Thus obtained mixture was uniformly coated and extended on a cotton cloth, and the surface of the film was colored in red brown color in the normal state, and thus obtained screen 36 was used, and in the same manner as in the embodiment of FIG. 8, the projection was carried out.

The light source as the means for eliminating the color can be visible light, ultraviolet ray or the mixture of visible light and ultraviolet ray.

The ultraviolet ray obtained by passing the light from a 250 w. tungsten lamp 31 or a 500 w. ultra-high pressure mercury lamp 31 through a visible light cut filter 32, was projected to a positive slide or positive cine-film 33, and the light having passed therethrough was condensed by the condenser 34, and the condensed light was sent into the projector lens 35, and was projected onto the screen 36.

The portion on the surface of the screen where the light has arrived, was eliminated of the color, and the positive projected image corresponding to the positive film, was obtained.

What is claimed is:

1. A photochromic composition which comprises a photochromic material selected from the group consisting of carbinols, cyanides, sulfides, spiropyrans, anils, nitrobenzyl pyridines, azobenzenes, stilbene and bianthrones in contact with at least one stabilizer of the class (A) selected from the group consisting of an electron donor selected from naphthalene, anthracene, pyrene, tetracene and perylene; an electron acceptor selected from chloroanil and bromoanil; a proton donor selected from p-nitrophenol, acetic acid, malonic acid and crotonic acid; and a proton acceptor selected from acridine, quinoline, pyridine and azobenzene; and (B) a solid matter selected from the group consisting of solid Lewis acids selected from natural clay mineral, acidic terra abla, clarite, bentonite, kaolin, fuller's earth, montmorillonite, fluoridine, silica-alumina, silica-magnesia and silica-boria; and solid Lewis bases selected from CaO, MgO, BeO, $SiO_2$, $Na_2CO_3$, $K_2CO_3$, $KHCO_3$, $(NH_4)_2CO_3$ $BaCO_3$, silica gel impregnated with caustic soda, silica gel impregnated with potatssium hydroxide, ammonia activated carbon and nitrous oxide activated carbon, said photochromic material being characterized by exhibiting a photocolor developing and eliminating property such that upon irradiation of such material by radiation having a specific absorption wave length range in the visible light region sad material is color developed, and the color developed state is eliminated by exposing said material in said color developed state to a radiation having an absorption wave length different from that of the previously applied radiation.

2. A photochromic composition according to claim 1 wherein the stabilizer comprises (A).

3. A photochromic composition according to claim 1 wherein the material is mixed with stabilizer (B).

4. A photochromic composition according to claim 1, wherein said photochromic material is dispersed on a surface of said stabilizer (b).

5. A photochromic composition according to claim 1, wherein said stabilizer comprises (b).

References Cited

UNITED STATES PATENTS

| | | | |
|---|---|---|---|
| 3,501,410 | 3/1970 | Newland et al. | 96—90 R |
| 3,407,195 | 10/1968 | Brule | 96—90 PC |

| | | | |
|---|---|---|---|
| 3,322,542 | 5/1967 | Fisher et al. | 96—90 PC |
| 3,501,410 | 3/1970 | Newland | 252—300 |
| 3,341,300 | 9/1967 | Foris | 96—90 PC |
| 3,483,162 | 12/1969 | Kovalic | 96—90 PC |

FOREIGN PATENTS

| | | | |
|---|---|---|---|
| 6,500,513 | 1/1965 | Netherlands | 96—90 PC |

OTHER REFERENCES

Jour. Phys. Chem., 69, 677–78, February 1965.

RONALD H. SMITH, Primary Examiner

J. L. GOODROW, Assistant Examiner

U.S. Cl. X.R.

96—90 R